US009632620B2

(12) United States Patent
Liu

(10) Patent No.: US 9,632,620 B2
(45) Date of Patent: Apr. 25, 2017

(54) TOUCH PANEL, METHOD FOR DETERMINING TOUCH POINT AND DISPLAY DEVICE

(71) Applicant: BOE TECHNOLOGY GROUP CO., LTD., Beijing (CN)

(72) Inventor: Xiaolong Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/771,656

(22) PCT Filed: Jan. 5, 2015

(86) PCT No.: PCT/CN2015/070110
§ 371 (c)(1),
(2) Date: Aug. 31, 2015

(87) PCT Pub. No.: WO2016/045244
PCT Pub. Date: Mar. 31, 2016

(65) Prior Publication Data
US 2016/0364064 A1 Dec. 15, 2016

(30) Foreign Application Priority Data

Sep. 24, 2014 (CN) .......................... 2014 1 0494398

(51) Int. Cl.
G06F 3/045 (2006.01)
G06F 3/041 (2006.01)
(52) U.S. Cl.
CPC ............ *G06F 3/0416* (2013.01); *G06F 3/045* (2013.01); *G06F 3/0412* (2013.01); *G06F 2203/04112* (2013.01)
(58) Field of Classification Search
CPC ........ G06F 3/045; G06F 3/041; G06F 3/0412; G06F 3/0414; G06F 3/0416;
(Continued)

(56) References Cited

U.S. PATENT DOCUMENTS

2009/0128512 A1* 5/2009 Segev ..................... G06F 21/83
345/174
2011/0261011 A1* 10/2011 Sakamoto ............... G06F 3/045
345/174

FOREIGN PATENT DOCUMENTS

CN 101271374 A 9/2008
CN 101452129 A 6/2009
(Continued)

OTHER PUBLICATIONS

Written Opinion of the International Searching Authority for international application No. PCT/CN2015/070110.

Primary Examiner — Grant Sitta
Assistant Examiner — Amen Bogale
(74) Attorney, Agent, or Firm — Harness, Dickey & Pierce, P.L.C.

(57) ABSTRACT

A touch panel, a method for determining a touch point and a display device are provided in the present disclosure, to solve low sensitivity of an existing touch panel. The touch panel includes a first transparent conductive layer and a second transparent conductive layer opposite to and away from each other. A first voltage signal terminal and a second voltage signal terminal opposite to the first voltage signal terminal are arranged on the first transparent conductive layer, a third voltage signal terminal and a fourth voltage signal terminal opposite to the third voltage signal terminal are arranged on the second transparent conductive layer, and an extension direction of the first voltage signal terminal is perpendicular to an extension direction of the third voltage signal terminal. The second voltage signal terminal and the fourth voltage signal terminal are short-circuited. The touch display panel further includes a voltage output unit, a read unit and a calculation unit.

6 Claims, 3 Drawing Sheets

(58) Field of Classification Search
CPC ........... G06F 2203/04113; G06F 3/038; G06F 3/0488; G06F 3/033; G06F 3/0418; G06F 3/044; G06F 3/016; G06F 3/04112; G06F 2250/22; H04M 2250/22; G06K 11/06; G02F 1/13338
See application file for complete search history.

(56) References Cited

FOREIGN PATENT DOCUMENTS

| | | | |
|---|---|---|---|
| CN | 101464768 | A | 6/2009 |
| CN | 102981688 | A | 3/2013 |
| CN | 103218103 | A | 7/2013 |
| CN | 103412699 | A | 11/2013 |
| CN | 203350858 | U | 12/2013 |
| JP | 2012014683 | A | 1/2012 |
| WO | WO-01-61634 | A2 | 8/2001 |

* cited by examiner

-Related art-

-Related art-

-Related art-

TOUCH PANEL, METHOD FOR DETERMINING TOUCH POINT AND DISPLAY DEVICE

CROSS-REFERENCE TO RELATED APPLICATIONS

This application is the U.S. national phase of PCT Application No. PCT/CN2015/070110 filed on Jan. 5, 2015, which claims a priority to Chinese Patent Application No. 201410494398.9 filed on Sep. 24, 2014, the disclosure of which is incorporated in its entirety by reference herein.

TECHNICAL FIELD

The present disclosure relates to the field of display technology, and in particular to a touch panel, a method for determining a touch point and a display device.

BACKGROUND

At present, one structure of a four-wire resistive touch panel is shown in FIG. 1, a glass substrate is covered by two indium-tin oxide (ITO) transparent conductive layers (i.e., a first transparent conductive layer 1 and a second transparent conductive layer 2) serving as X electrode and Y electrode, respectively. The two ITO transparent conductive layers are covered by a PET film. The two ITO transparent conductive layers are separated from each other, the lower ITO transparent conductive layer is attached to the glass substrate, and the upper ITO transparent conductive layer is attached to the PET film. Positive and negative terminals of the X electrode and positive and negative terminals of the Y electrode are respectively led out from two ends of the X electrode and two ends of the Y electrode by conductive bars (black bar-like portions in the FIG. 1), and the conductive bar of the X electrode is perpendicular to the conductive bar of the Y electrode. The positive and negative terminals of the X electrode include a first voltage signal terminal X+ and a second voltage signal terminal X−, and the positive and negative terminals of the Y electrode includes a third voltage signal terminal Y+ and a fourth voltage signal terminal Y−, there are four connecting terminals, and that is how the four-wire resistive touch panel gets its name. When an object contacts and applies a certain pressure on a surface of the touch panel to perform touch operation on the touch panel, the upper ITO transparent conductive layer is deformed to contact the lower ITO transparent conductive layer. Such a structure may be equivalent to a corresponding circuit as shown in FIG. 2 and FIG. 3 (resistance RT at a touch point is very small and thus is ignored).

First, an X coordinate of the touch point is calculated. A driving voltage U is applied to the third voltage signal terminal Y+, the fourth voltage signal terminal Y− is grounded, and the first voltage signal terminal X+ is served as a leading terminal to measure a voltage Vx of the touch point. The ITO transparent conductive layer is homogeneously conductive. A ratio of the voltage Vx of the touch point to the driving voltage U is equal to a ratio of the X coordinate of the touch point and a width a of the touch panel, i.e., Vx/U=X/a.

Then, a Y coordinate of the touch point is calculated. A driving voltage U is applied to the first voltage signal terminal X+, the second voltage signal terminal X− is grounded, and the third voltage signal terminal Y+ is served as a leading terminal to measure a voltage Vy of the touch point. The ITO transparent conductive layer is homogeneously conductive. A ratio of the voltage Vy of the touch point to the driving voltage U is equal to a ratio of the Y coordinate of the touch point and a height b of the touch panel, i.e., Vy/U=Y/b.

The calculated coordinates of the touch point are $$\begin{cases} X = \dfrac{V_x}{U} a \\ Y = \dfrac{V_y}{U} b \end{cases}$$

The inventor founds that at least following issues are existed in the related art: it can be seen from the equivalent circuit diagrams (FIG. 2 and FIG. 3) that, the first voltage signal terminal X+ is served as one leading terminal to measure the voltage Vx of the touch point when calculating the X coordinate of the touch point, and the third voltage signal terminal Y+ is served as one leading terminal to measure the voltage Vy of the touch point when calculating the Y coordinate of the touch point. In this case, $$V_x = \frac{R_4}{R_3 + R_4} U, \quad V_y = \frac{R_2}{R_1 + R_2} U.$$

When the size of the touch panel is large, resistances of the various resistors are large, so errors of the calculated Vx of the touch point and the Vy thereof may be relatively big, thereby a calculated location (coordinates) of the touch point is not accurate, and sensitivity of the touch panel may is lower.

SUMMARY

The present disclosure is to provide a touch panel with high touch sensitivity and a method for determining a touch point and a display device in order to solve the issues in the touch panel of the related art.

A technical scheme to solve the issues presented by the present disclosure is to provide a touch panel, including a first transparent conductive layer and a second transparent conductive layer opposite to and away from each other; a first voltage signal terminal and a second voltage signal terminal opposite to the first voltage signal terminal are arranged on the first transparent conductive layer, a third voltage signal terminal and a fourth voltage signal terminal opposite to the third voltage signal terminal are arranged on the second transparent conductive layer, and an extension direction of the first voltage signal terminal is perpendicular to an extension direction of the third voltage signal terminal. The second voltage signal terminal and the fourth voltage signal terminal are short-circuited. The touch display panel further includes a voltage output unit, a read unit and a calculation unit. The voltage output unit is configured to input a driving voltage to the first voltage signal terminal and the third voltage signal terminal alternately and input a low voltage to the second voltage signal terminal and the fourth voltage signal terminal which are short-circuited based on a control signal. The read unit is configured to read a voltage value of the third voltage signal terminal when inputting the driving voltage to the first voltage signal terminal and read a voltage value of the first voltage signal terminal when inputting the driving voltage to the third voltage signal terminal. The calculation unit is configured to calculate a coordinate value of a touch point based on the read voltage value of the third voltage signal terminal and the read voltage value of the first voltage signal terminal.

The touch panel further includes a control unit configured to generate the control signal to control a voltage output of the voltage output unit.

The voltage output unit inputs a low voltage of 0V to the second voltage signal terminal and the fourth voltage signal terminal which are short-circuited.

The calculation unit calculates the coordinate value (X, Y) of the touch point based on the following formula:

$$\begin{cases} X = a\dfrac{aV_y(U-V_x)}{R_Y V_x(U-V_y)}; \\[2mm] \dfrac{UV_y - 2V_x V_y R_X + UV_x R_Y}{V_x} - \\[2mm] \dfrac{\sqrt{\left(\dfrac{UV_y - 2V_x V_y R_X + UV_x R_Y}{V_x}\right)^2 - 4\dfrac{V_y(V_x V_y - U^2)}{V_x(U-V_y)} R_X R_Y (U-V_y)}}{2\dfrac{V_y(V_x V_y - U^2)}{V_x(U-V_y)}} \\[2mm] Y = \dfrac{b}{R_X}\left(R_X \dfrac{\dfrac{UV_y - 2V_x V_y R_X + UV_x R_Y}{V_x} - \sqrt{\left(\dfrac{UV_y - 2V_x V_y R_X + UV_x R_Y}{V_x}\right)^2 - 4\dfrac{V_y(V_x V_y - U^2)}{V_x(U-V_y)} R_X R_Y (U-V_y)}}{2\dfrac{V_y(V_x V_y - U^2)}{V_x(U-V_y)}}\right) \end{cases}$$

R1 is resistance between the touch point and the first voltage signal terminal; R2 is resistance between the touch point and the second voltage signal terminal; R3 is resistance between the touch point and the third voltage signal terminal; R4 is resistance between the touch point and the fourth voltage signal terminal; $R_1+R_2=R_X$; $R_3+R_4=R_Y$;

$$R_\Delta = \frac{R_2 \cdot R_4}{R_2 + R_4};$$

a is a vertical distance between the third voltage signal terminal and the fourth voltage signal terminal on the touch panel; b is a vertical distance between the first voltage signal terminal and the second voltage signal terminal on the touch panel; Vx is the read voltage value of the first voltage signal terminal; and Vy is the read voltage value of the third voltage signal terminal.

Another technical scheme to solve the issues presented by the present disclosure is to provide a method for determining a touch point on a touch panel which is the above touch panel. The method includes: inputting a driving voltage to the first voltage signal terminal and the third voltage signal terminal alternately, and inputting simultaneously a low voltage to the second voltage signal terminal and the fourth voltage signal terminal which are short-circuited; reading a voltage value of the third voltage signal terminal when inputting the driving voltage to the first voltage signal terminal, and reading a voltage value of the first voltage signal terminal when inputting the driving voltage to the third voltage signal terminal; and calculating a coordinate value of a touch point based on the read voltage value of the third voltage signal terminal and the read voltage value of the first voltage signal terminal.

A step of inputting the driving voltage to the first voltage signal terminal and the third voltage signal terminal alternately and inputting simultaneously the low voltage to the second voltage signal terminal and the fourth voltage signal terminal which are short-circuited includes: under a control of a control signal, inputting the driving voltage to the first voltage signal terminal and the third voltage signal terminal alternately and inputting simultaneously the low voltage to the second voltage signal terminal and the fourth voltage signal terminal which are short-circuited.

A low voltage of 0V is input to the second voltage signal terminal and the fourth voltage signal terminal which are short-circuited.

The coordinate value of the touch point is calculated based on the following formula:

$$\begin{cases} X = a\dfrac{aV_y(U-V_x)}{R_Y V_x(U-V_y)}; \\[2mm] \dfrac{UV_y - 2V_x V_y R_X + UV_x R_Y}{V_x} - \\[2mm] \dfrac{\sqrt{\left(\dfrac{UV_y - 2V_x V_y R_X + UV_x R_Y}{V_x}\right)^2 - 4\dfrac{V_y(V_x V_y - U^2)}{V_x(U-V_y)} R_X R_Y (U-V_y)}}{2\dfrac{V_y(V_x V_y - U^2)}{V_x(U-V_y)}} \\[2mm] Y = \dfrac{b}{R_X}\left(R_X \dfrac{\dfrac{UV_y - 2V_x V_y R_X + UV_x R_Y}{V_x} - \sqrt{\left(\dfrac{UV_y - 2V_x V_y R_X + UV_x R_Y}{V_x}\right)^2 - 4\dfrac{V_y(V_x V_y - U^2)}{V_x(U-V_y)} R_X R_Y (U-V_y)}}{2\dfrac{V_y(V_x V_y - U^2)}{V_x(U-V_y)}}\right) \end{cases}$$

where R1 is resistance between the touch point and the first voltage signal terminal; R2 is resistance between the touch point and the second voltage signal terminal; R3 is resistance between the touch point and the third voltage signal terminal; R4 is resistance between the touch point and the fourth voltage signal terminal; $R_1+R_2=R_X$; $R_3+R_4=R_Y$;

$$R_\Delta = \frac{R_2 \cdot R_4}{R_2 + R_4};$$

a is a vertical distance between the third voltage signal terminal and the fourth voltage signal terminal on the touch panel; b is a vertical distance between the first voltage signal terminal and the second voltage signal terminal on the touch panel; Vx is the read voltage value of the first voltage signal terminal; and Vy is the read voltage value of the third voltage signal terminal.

Yet another technical scheme to solve the issues presented by the present disclosure is to provide a display device including the above touch panel.

Since the second voltage signal terminal and the fourth voltage signal terminal are short-circuited and the low voltage signal is input to the second voltage signal terminal and the fourth voltage signal terminal simultaneously, thus, resistors between the touch point and the low voltage terminal are connected in parallel, thereby reducing the resistance between the touch point and the low voltage terminal, and improving the accuracy of voltage measurement and the sensitivity of the touch panel.

The location (coordinate) of the touch point may be determined more accurately by the method for determining the touch point on the touch panel according to the present disclosure.

The display device according to the present disclosure has better performance due to the touch panel hereinabove.

BRIEF DESCRIPTION OF THE DRAWINGS

FIG. 1 is touched.

DETAILED DESCRIPTION

To make the technical scheme of the present disclosure better understood by those skilled in the art, the present disclosure may be described in details in conjunction with drawings and embodiments.

[Embodiment 1]

Figure 1:
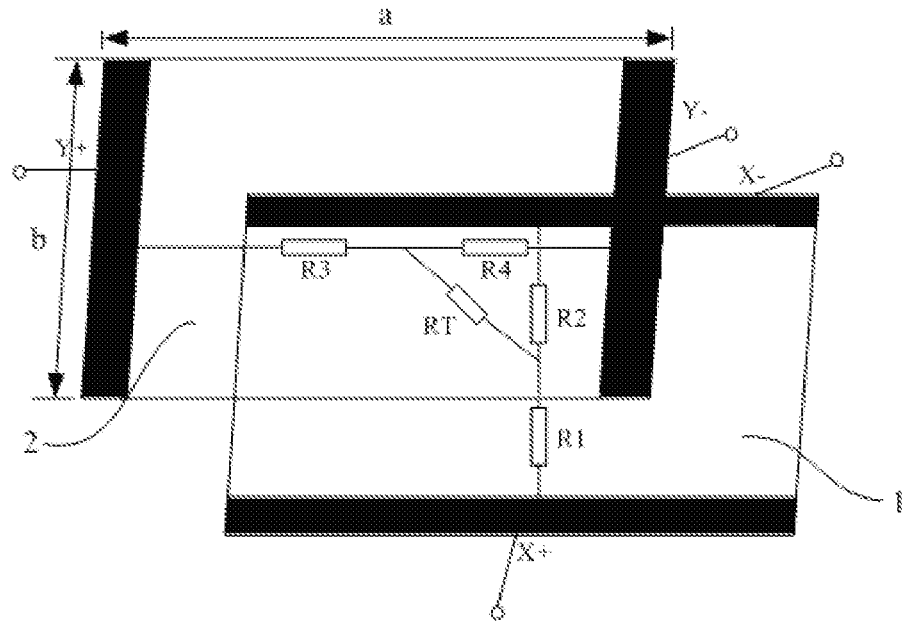
FIG. 1 is a schematic view showing a structure of a touch panel in the related art.
Figure 2:
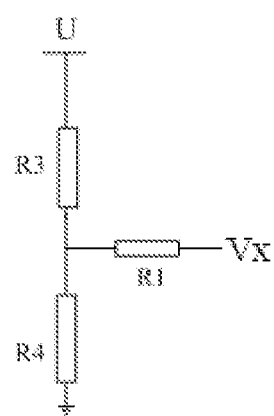
FIG. 2 is an equivalent circuit diagram when calculating an X coordinate of a touch point when the touch panel in FIG. 1 is touched.
Figure 3:
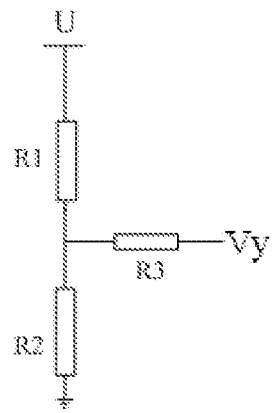
FIG. 3 is an equivalent circuit diagram when calculating a Y coordinate of the touch point when the touch panel
Figure 4:
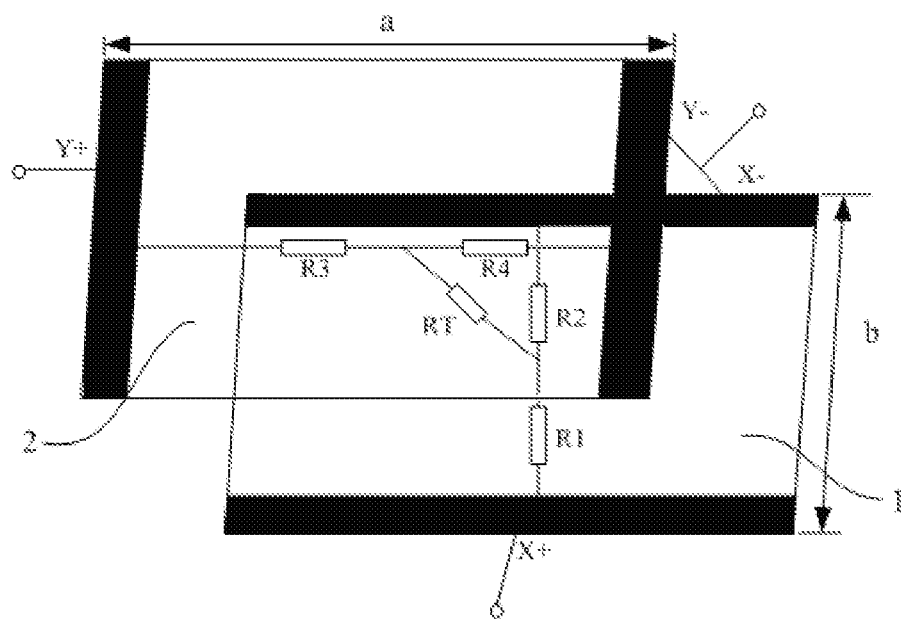
FIG. 4 is a schematic view showing a structure of a touch panel according to one embodiment of the present disclosure.

As shown in FIG. 4, a touch panel is provided in the present disclosure. The touch panel includes a first transparent conductive layer 1 and a second transparent conductive layer 2 opposite to and away from each other. A first voltage signal terminal X+ and a second voltage signal terminal X− opposite to the first voltage signal terminal X+ are arranged on the first transparent conductive layer 1. A third voltage signal terminal Y+ and a fourth voltage signal terminal Y− opposite to the third voltage signal terminal Y+ are arranged on the second transparent conductive layer 2. An extension direction of the first voltage signal terminal X+ is perpendicular to an extension direction of the third voltage signal terminal Y+. The second voltage signal terminal X− and the fourth voltage signal terminal Y− are short-circuited. The touch display panel further includes a voltage output unit, a read unit and a calculation unit. The voltage output unit is configured to, according to a control signal, alternately input a driving voltage to the first voltage signal terminal X+ and the third voltage signal terminal Y+ and input a low voltage to the second voltage signal terminal X− and the fourth voltage signal terminal Y− which are short-circuited. The read unit is configured to read a voltage value of the third voltage signal terminal Y+ when inputting the driving voltage to the first voltage signal terminal X+ and read a voltage value of the first voltage signal terminal X+ when inputting the driving voltage to the third voltage signal terminal Y+. The calculation unit is configured to calculate a coordinate value of a touch point based on a read voltage value of the third voltage signal terminal Y+ and a read voltage value of the first voltage signal terminal X+.

Figure 5:
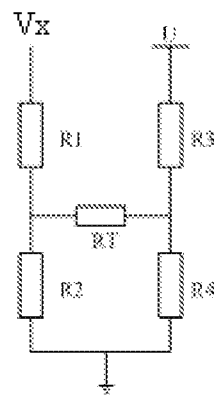
FIG. 5 is an equivalent circuit diagram when calculating an X coordinate of a touch point when the touch panel in FIG. 4 is touched.
Figure 6:
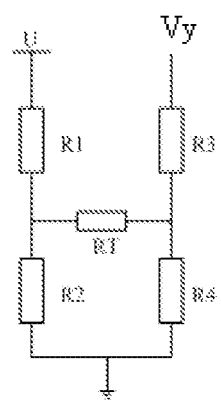
FIG. 6 is an equivalent circuit diagram when calculating a Y coordinate of the touch point when the touch panel in FIG. 4 is touched.

As shown in FIG. 5 and FIG. 6, in this embodiment, supposing that the driving voltage provided by the voltage output unit is U, the low voltage is 0V, and resistance RT at the touch point is very small and thereby it is ignored. When calculating an X coordinate of the touch point, the first voltage signal terminal X+ is served as a leading terminal and a measured voltage Vx may be a voltage of the touch point, $$V_x = \frac{R_\Delta}{R_\Delta + R_3} U,$$

where $R_\Delta$ is a parallel resistance of R3 and R4, i.e., $$R_\Delta = \frac{R_2 \cdot R_4}{R_2 + R_4},$$

so resistance of $R_\Delta$ is smaller than that of R4. Therefore, compared with the Vx measured according to the related art, the voltage Vx measured according to the embodiment of the present disclosure may be of a smaller error and have a higher accuracy. In a similar way, when calculating a Y coordinate of the touch point, the third voltage signal terminal Y+ is served as a leading terminal and a measured voltage Vy may be a voltage of the touch point, $$V_y = \frac{R_\Delta}{R_\Delta + R_1} U.$$

The resistance of $R_\Delta$ is also smaller than that of R2, therefore the voltage Vy measured according to the embodiment of the present disclosure may be more accurate than the Vy measured according to the related art. In this embodiment, the second voltage signal terminal X− and the fourth voltage signal terminal Y− are shorted, resistors between the touch point and a low voltage terminal are connected in parallel, thus an equivalent resistance between the touch point and the low voltage terminal is reduced, thereby a big size resistive touch panel may be equivalent to a small size resistive touch panel, and low sensitivity of the big size resistive touch panel is solved.

Optionally, the touch panel further includes a control unit configured to generate the control signal to control a voltage output of the voltage output unit. The control signal generated by the control unit may control the voltage output unit to output the driving voltage to the third voltage signal terminal Y+ at a first time point and simultaneously output a low voltage to the second voltage signal terminal X− and the fourth voltage signal terminal Y− mutually shorted, thereby measuring and obtaining the voltage Vx of the first voltage signal terminal X+. The control signal generated by the control unit may control the voltage output unit to output the driving voltage to the first voltage signal terminal X+ at a second time point and simultaneously output the low voltage to the second voltage signal terminal X− and the fourth voltage signal terminal Y− which are short-circuited, thereby measuring and obtaining the voltage Vy of the third voltage signal terminal Y+. As a result, a location (coordinates) of the touch point may be determined based on the obtained Vx and Vy. To better measure and calculate the coordinate value of the touch point, optionally, the voltage output unit may output a low voltage of 0V to the second voltage signal terminal X− and the fourth voltage signal terminal Y− which are short-circuited. Of course, the output voltage may be any voltage lower than the driving voltage.

In conjunction with the equivalent circuit diagrams shown in FIG. 5 and FIG. 6, when the voltage output unit inputs a low voltage of 0V to the second voltage signal terminal X− and the fourth voltage signal terminal Y− which mutually shorted (i.e., both the second voltage signal terminal X− and the fourth voltage signal terminal Y− are grounded), R1 is resistance between the touch point and the first voltage signal terminal X+, R2 is resistance between the touch point and the second voltage signal terminal X−, R3 is resistance between the touch point and the third voltage signal terminal Y+, and R4 is resistance between the touch point and the fourth voltage signal terminal Y−. Supposing $R_1+R_2=R_X$, $R_3+R_4=R_Y$, $$R_\Delta = \frac{R_2 \cdot R_4}{R_2 + R_4},$$

a is a vertical distance between the third voltage signal terminal Y+ and the fourth voltage signal terminal Y− on the touch panel, b is a vertical distance between the first voltage signal terminal X+ and the second voltage signal terminal X− on the touch panel, Vx is a read voltage value of the first voltage signal terminal X+, and Vy is read voltage value of the third voltage signal terminal Y+.

The calculation unit calculates a coordinate value (X, Y) of the touch point based on the following formula:

$$\begin{cases} V_x = \frac{R_\Delta}{R_\Delta + R_3} U \\ V_y = \frac{R_\Delta}{R_\Delta + R_1} U \\ R_1 = \frac{b-Y}{b} R_X, R_2 = \frac{Y}{b} R_X \\ R_3 = \frac{a-X}{a} R_Y, R_4 = \frac{X}{a} R_Y \end{cases}$$

the above formula is simplified as:

$$R_1^2 \frac{V_y(V_xV_y - U^2)}{V_x(U - V_y)} - R_1 \frac{UV_y - 2V_xV_yR_X + UV_xR_Y}{V_x} + R_XR_Y(U - V_y) = 0$$

and is solved to obtain:

$$R_1 = \frac{\frac{UV_y - 2V_xV_yR_X + UV_xR_Y}{V_x} \pm \sqrt{\left(\frac{UV_y - 2V_xV_yR_X + UV_xR_Y}{V_x}\right)^2 - 4\frac{V_y(V_xV_y - U^2)}{V_x(U - V_y)} R_XR_Y(U - V_y)}}{2\frac{V_y(V_xV_y - U^2)}{V_x(U - V_y)}}$$

Since $(U-V_y)>0$ and $(V_xV_y-U^2)<0$, so a denominator of the formula is less than 0. Since R1>0, which requires that a numerator of the formula is less than 0. Obviously, the only solution for R1 may be determined as:

$$R_1 = \frac{\frac{UV_y - 2V_xV_yR_X + UV_xR_Y}{V_x} - \sqrt{\left(\frac{UV_y - 2V_xV_yR_X + UV_xR_Y}{V_x}\right)^2 - 4\frac{V_y(V_xV_y - U^2)}{V_x(U - V_y)} R_XR_Y(U - V_y)}}{2\frac{V_y(V_xV_y - U^2)}{V_x(U - V_y)}}$$

The above equation is solved to obtain the coordinate value (X, Y) of the touch point as:

$$\begin{cases} X = a\frac{aV_y(U - V_x)}{R_YV_x(U - V_y)} \cdot \frac{\frac{UV_y - 2V_xV_yR_X + UV_xR_Y}{V_x} - \sqrt{\left(\frac{UV_y - 2V_xV_yR_X + UV_xR_Y}{V_x}\right)^2 - 4\frac{V_y(V_xV_y - U^2)}{V_x(U - V_y)} R_XR_Y(U - V_y)}}{2\frac{V_y(V_xV_y - U^2)}{V_x(U - V_y)}} \\ Y = \frac{b}{R_X}\left(R_X \frac{\frac{UV_y - 2V_xV_yR_X + UV_xR_Y}{V_x} - \sqrt{\left(\frac{UV_y - 2V_xV_yR_X + UV_xR_Y}{V_x}\right)^2 - 4\frac{V_y(V_xV_y - U^2)}{V_x(U - V_y)} R_XR_Y(U - V_y)}}{2\frac{V_y(V_xV_y - U^2)}{V_x(U - V_y)}}\right) \end{cases}$$

According to this embodiment, the resistance RT at the touch point is very small and thereby it is ignored, on the basis of this, the second voltage signal terminal X− and the fourth voltage signal terminal Y− are shorted, to connect in parallel resistors between the touch point and the low voltage terminal so as to reduce the resistance between the touch point and the low voltage terminal, thereby improving the accuracy of voltage measurement and the sensitivity of the touch panel.

[Embodiment 2]

A method for determining a touch point on a touch panel is provided in the embodiment. The touch panel is the touch panel according to the embodiment 1. The method includes: inputting a driving voltage to the first voltage signal terminal X+ and the third voltage signal terminal Y+ alternately, and inputting simultaneously a low voltage to the second voltage signal terminal X− and the fourth voltage signal terminal Y− which are short-circuited; reading a voltage value of the third voltage signal terminal Y+ when inputting the driving voltage to the first voltage signal terminal X+, and reading a voltage value of the first voltage signal terminal X+ when inputting the driving voltage to the third voltage signal terminal Y+; and calculating a coordinate value of a touch point based on the read voltage value of the third voltage signal terminal Y+ and the read voltage value of the first voltage signal terminal X+.

Optionally, a step of inputting the driving voltage to the first voltage signal terminal X+ and the third voltage signal terminal Y+ alternately and inputting simultaneously the low voltage to the second voltage signal terminal X− and the fourth voltage signal terminal Y− which are short-circuited includes: under a control of a control signal, inputting the driving voltage to the first voltage signal terminal X+ and the third voltage signal terminal Y+ alternately and inputting simultaneously the low voltage to the second voltage signal terminal X− and the fourth voltage signal terminal Y− which are short-circuited.

To determine the coordinate of the touch point more easily, a low voltage of 0V is input to the second voltage signal terminal X− and the fourth voltage signal terminal Y− which are short-circuited.

Optionally, the coordinate value of the touch point is calculated based on the following formula:

$$\begin{cases} X = a\frac{aV_y(U-V_x)}{R_Y V_x(U-V_y)} \cdot \frac{\frac{UV_y - 2V_xV_yR_X + UV_xR_Y}{V_x} - \sqrt{\left(\frac{UV_y - 2V_xV_yR_X + UV_xR_Y}{V_x}\right)^2 - 4\frac{V_y(V_xV_y - U^2)}{V_x(U-V_y)}R_XR_Y(U-V_y)}}{2\frac{V_y(V_xV_y - U^2)}{V_x(U-V_y)}} \\ Y = \frac{b}{R_X}\left(R_X \frac{\frac{UV_y - 2V_xV_yR_X + UV_xR_Y}{V_x} - \sqrt{\left(\frac{UV_y - 2V_xV_yR_X + UV_xR_Y}{V_x}\right)^2 - 4\frac{V_y(V_xV_y - U^2)}{V_x(U-V_y)}R_XR_Y(U-V_y)}}{2\frac{V_y(V_xV_y - U^2)}{V_x(U-V_y)}}\right) \end{cases}$$

R1 is resistance between the touch point and the first voltage signal terminal X+; R2 is resistance between the touch point and the second voltage signal terminal X−; R3 is resistance between the touch point and the third voltage signal terminal Y+; R4 is resistance between the touch point and the fourth voltage signal terminal Y−; $R_1+R_2=R_X$; $R_3+R_4=R_Y$;

$$R_\Delta = \frac{R_2 \cdot R_4}{R_2 + R_4};$$

a is a vertical distance between the third voltage signal terminal Y+ and the fourth voltage signal terminal Y− on the touch panel; b is a vertical distance between the first voltage signal terminal X+ and the second voltage signal terminal X− on the touch panel; Vx is a read voltage value of the first voltage signal terminal X+; and Vy is read voltage value of the third voltage signal terminal Y+.

A derivation of the formula is the same as that in the embodiment 1, and the description thereof is omitted herein.

The touch panel is the touch panel according to the embodiment 1, so a touched location (coordinate) on the touch panel may be determined accurately by the method for determining the location (coordinate) of the touch point on the touch panel provided by the embodiment 2.

[Embodiment 3]

A display device is provided in the embodiment 3, including the touch panel according to the embodiment 1, so the display device according to the embodiment 3 is of high sensitivity.

The display device may be a product or a component with display function such as cell phone, tablet PC, television, display, laptop, digital photo frame and navigator.

Optionally, the display device according to this embodiment may further include other normal structure such as a display driving unit.

It may be understood that, the above embodiments are merely the exemplary embodiments for illustrating a principle of the present disclosure, but the present disclosure is not limited thereto. Those skilled in the art may make various modifications and improvements without departing from the spirit and essence of the present disclosure, and these modifications and improvements may also fall into the scope of the present disclosure.

What is claimed is:

1. A touch panel, comprising a first transparent conductive layer and a second transparent conductive layer opposite to and away from each other; wherein a first voltage signal terminal and a second voltage signal terminal opposite to the first voltage signal terminal are arranged on the first transparent conductive layer, a third voltage signal terminal and a fourth voltage signal terminal opposite to the third voltage signal terminal are arranged on the second transparent conductive layer, and an extension direction of the first voltage signal terminal is perpendicular to an extension direction of the third voltage signal terminal;
wherein the second voltage signal terminal and the fourth voltage signal terminal are short-circuited;
wherein the touch panel further comprises:
  a voltage output unit, configured to input a driving voltage to the first voltage signal terminal and the third voltage signal terminal alternately and input a low voltage to the second voltage signal terminal and the fourth voltage signal terminal which are short-circuited based on a control signal;
  a read unit, configured to read a voltage value of the third voltage signal terminal when inputting the driving voltage to the first voltage signal terminal and read a voltage value of the first voltage signal terminal when inputting the driving voltage to the third voltage signal terminal; and
  a calculation unit, configured to calculate a coordinate value of a touch point based on the read voltage value of the third voltage signal terminal and the read voltage value of the first voltage signal terminal;
wherein the voltage output unit inputs a low voltage of 0V to the second voltage signal terminal and the fourth voltage signal terminal which are short-circuited;
wherein the calculation unit calculates the coordinate value of the touch point based on the following formula:

$$\begin{cases} X = a\dfrac{aV_y(U-V_x)}{R_Y V_x(U-V_y)} \cdot \dfrac{\dfrac{UV_y - 2V_x V_y R_X + UV_x R_Y}{V_x} - \sqrt{\left(\dfrac{UV_y - 2V_x V_y R_X + UV_x R_Y}{V_x}\right)^2 - 4\dfrac{V_y(V_x V_y - U^2)}{V_x(U-V_y)} R_X R_Y(U-V_y)}}{2\dfrac{V_y(V_x V_y - U^2)}{V_x(U-V_y)}} \\ Y = \dfrac{b}{R_X}\left(R_X \dfrac{\dfrac{UV_y - 2V_x V_y R_X + UV_x R_Y}{V_x} - \sqrt{\left(\dfrac{UV_y - 2V_x V_y R_X + UV_x R_Y}{V_x}\right)^2 - 4\dfrac{V_y(V_x V_y - U^2)}{V_x(U-V_y)} R_X R_Y(U-V_y)}}{2\dfrac{V_y(V_x V_y - U^2)}{V_x(U-V_y)}}\right) \end{cases}$$

where R1 is resistance between the touch point and the first voltage signal terminal;
R2 is resistance between the touch point and the second voltage signal terminal;
R3 is resistance between the touch point and the third voltage signal terminal;
R4 is resistance between the touch point and the fourth voltage signal terminal;

$R_1 + R_2 = R_X$;

$R_3 + R_4 = R_Y$;

$R_\Delta = \dfrac{R_2 \cdot R_4}{R_2 + R_4}$;

a is a vertical distance between the third voltage signal terminal and the fourth voltage signal terminal on the touch panel;

b is a vertical distance between the first voltage signal terminal and the second voltage signal terminal on the touch panel;

Vx is the read voltage value of the first voltage signal terminal;

Vy is the read voltage value of the third voltage signal terminal; and

U is the driving voltage.

2. The touch panel according to claim 1, wherein the touch panel further comprises a control unit configured to generate the control signal to control a voltage output of the voltage output unit.

3. A display device comprising the touch panel according to claim 1.

4. The display device according to claim 3, wherein the touch panel further comprises a control unit configured to generate a control signal to control a voltage output of the voltage output unit.

5. A method for determining a touch point on a touch panel which comprises a first transparent conductive layer and a second transparent conductive layer opposite to and away from each other; wherein a first voltage signal terminal and a second voltage signal terminal opposite to the first voltage signal terminal are arranged on the first transparent conductive layer, a third voltage signal terminal and a fourth voltage signal terminal opposite to the third voltage signal terminal are arranged on the second transparent conductive layer, and an extension direction of the first voltage signal terminal is perpendicular to an extension direction of the third voltage signal terminal; wherein the second voltage signal terminal and the fourth voltage signal terminal are short-circuited;

the method comprising:
  inputting a driving voltage to the first voltage signal terminal and the third voltage signal terminal alternately, and inputting simultaneously a low voltage to the second voltage signal terminal and the fourth voltage signal terminal which are short-circuited;
  reading a voltage value of the third voltage signal terminal when inputting the driving voltage to the first voltage signal terminal, and reading a voltage value of the first voltage signal terminal when inputting the driving voltage to the third voltage signal terminal; and
  calculating a coordinate value of a touch point based on the read voltage value of the third voltage signal terminal and the read voltage value of the first voltage signal terminal;
wherein the low voltage is 0V;
wherein the coordinate value of the touch point is calculated based on the following formula:

$$\begin{cases} X = a\dfrac{aV_y(U-V_x)}{R_Y V_x(U-V_y)} \cdot \dfrac{\dfrac{UV_y - 2V_x V_y R_X + UV_x R_Y}{V_x} - \sqrt{\left(\dfrac{UV_y - 2V_x V_y R_X + UV_x R_Y}{V_x}\right)^2 - 4\dfrac{V_y(V_x V_y - U^2)}{V_x(U-V_y)} R_X R_Y(U-V_y)}}{2\dfrac{V_y(V_x V_y - U^2)}{V_x(U-V_y)}} \\ \\ Y = \dfrac{b}{R_X}\left(R_X \dfrac{\dfrac{UV_y - 2V_x V_y R_X + UV_x R_Y}{V_x} - \sqrt{\left(\dfrac{UV_y - 2V_x V_y R_X + UV_x R_Y}{V_x}\right)^2 - 4\dfrac{V_y(V_x V_y - U^2)}{V_x(U-V_y)} R_X R_Y(U-V_y)}}{2\dfrac{V_y(V_x V_y - U^2)}{V_x(U-V_y)}}\right) \end{cases}$$

where R1 is resistance between the touch point and the first voltage signal terminal;

R2 is resistance between the touch point and the second voltage signal terminal;

R3 is resistance between the touch point and the third voltage signal terminal;

R4 is resistance between the touch point and the fourth voltage signal terminal;

$R_1 + R_2 = R_X$;

$R_3 + R_4 = R_Y$;

$R_\Delta = \dfrac{R_2 \cdot R_4}{R_2 + R_4}$;

a is a vertical distance between the third voltage signal terminal and the fourth voltage signal terminal on the touch panel;

b is a vertical distance between the first voltage signal terminal and the second voltage signal terminal on the touch panel;

Vx is the read voltage value of the first voltage signal terminal;

Vy is the read voltage value of the third voltage signal terminal; and

U is the driving voltage.

6. The method according to claim 5, wherein the step of inputting the driving voltage to the first voltage signal terminal and the third voltage signal terminal alternately and inputting simultaneously the low voltage to the second voltage signal terminal and the fourth voltage signal terminal which are short-circuited comprises:

under a control of a control signal, inputting the driving voltage to the first voltage signal terminal and the third voltage signal terminal alternately and inputting simultaneously the low voltage to the second voltage signal terminal and the fourth voltage signal terminal which are short-circuited.

* * * * *